United States Patent
Short et al.

(10) Patent No.: US 10,852,396 B2
(45) Date of Patent: Dec. 1, 2020

(54) TURNTABLE PERIPHERAL FOR 3D SCANNING

(71) Applicant: Hewlett-Packard Development Company, L.P., Houston, TX (US)

(72) Inventors: David Bradley Short, San Diego, CA (US); Jinman Kang, San Diego, CA (US); Stephen George Miller, Salt Lake City, UT (US); Jordi Morillo Peres, Barcelona (ES); Eric Monsef, Palo Alto, CA (US); Ben Wynne, San Diego, CA (US); Matthew Leck, San Francisco, CA (US); Daniel Jordan Kayser, San Francisco, CA (US); Eddie Licitra, San Francisco, CA (US); Christopher S Tanner, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 519 days.

(21) Appl. No.: 15/567,428

(22) PCT Filed: Jul. 31, 2015

(86) PCT No.: PCT/US2015/043334
§ 371 (c)(1),
(2) Date: Oct. 18, 2017

(87) PCT Pub. No.: WO2017/023290
PCT Pub. Date: Feb. 9, 2017

(65) Prior Publication Data
US 2018/0136320 A1 May 17, 2018

(51) Int. Cl.
*G01S 7/481* (2006.01)
*G01S 17/89* (2020.01)
(Continued)

(52) U.S. Cl.
CPC .......... *G01S 7/4817* (2013.01); *G01B 5/0004* (2013.01); *G01B 11/25* (2013.01);
(Continued)

(58) Field of Classification Search
CPC ........ G01S 7/4817; G01S 17/25; G01S 17/42; G01S 17/89; G01S 17/08
See application file for complete search history.

(56) References Cited

U.S. PATENT DOCUMENTS 5,838,428 A * 11/1998 Pipitone .................. G01S 17/46
356/3.09
6,353,222 B1 * 3/2002 Dotan ..................... H01J 37/28
250/307
(Continued)

FOREIGN PATENT DOCUMENTS

CN 202372154 8/2012
CN 103236076 A 8/2013
(Continued)

OTHER PUBLICATIONS

Kazo, et al ~ "High-quaiity Structured-light Scanning of 3D Objects Using Turntable" Dec. 2-5, 2012, ~ IEEE ~5 pages.
(Continued)

*Primary Examiner* — Eric L Bolda
(74) *Attorney, Agent, or Firm* — Perry + Currier Inc

(57) ABSTRACT

Examples relate to a turntable peripheral for three dimensional (3D) scanning. In some examples, 3D scan data of a real-world object is obtained while the object is rotated by the turntable peripheral. Positioning commands are sent to the turntable peripheral to rotate the object. The 3D scan data is collected while the turntable peripheral is in an untilted and/or tilted position.

12 Claims, 6 Drawing Sheets

(51) Int. Cl.
  *G01B 11/25* (2006.01)
  *G01S 17/42* (2006.01)
  *G01S 17/08* (2006.01)
  *G01B 5/00* (2006.01)
(52) U.S. Cl.
  CPC .............. *G01S 17/42* (2013.01); *G01S 17/89* (2013.01); *G01S 17/08* (2013.01)

(56) References Cited

U.S. PATENT DOCUMENTS

| | | |
|---|---|---|
| 6,611,617 B1 | 8/2003 | Crampton |
| 7,313,264 B2 | 12/2007 | Crampton |
| 2002/0051006 A1 | 5/2002 | Katagiri et al. |
| 2003/0068079 A1 | 4/2003 | Park |
| 2006/0042444 A1* | 3/2006 | Ushiwata ............. B23D 59/003 83/581 |
| 2006/0179984 A1* | 8/2006 | Stoops ................ B23Q 1/5475 83/34 |
| 2006/0188143 A1 | 8/2006 | Strassenburg-Kleciak |
| 2006/0245638 A1 | 11/2006 | Li |
| 2014/0362079 A1 | 12/2014 | Regan et al. |
| 2015/0138320 A1 | 5/2015 | El Daher |

FOREIGN PATENT DOCUMENTS

| | | |
|---|---|---|
| CN | 104424662 A | 3/2015 |
| EP | 1609437 | 12/2005 |
| EP | 2856969 | 4/2015 |
| JP | 2015-087295 A | 5/2015 |
| KR | 20130134818 | 12/2013 |
| KR | 20140115578 | 1/2014 |
| KR | 10-2014-0078139 | 6/2014 |
| TW | 201329509 A1 | 7/2013 |

OTHER PUBLICATIONS

Ponoko ~"Photon Desktop 3D Scanner Surpasses Funding Goal" Apr. 11, 2013, http://blog.ponoko.com ~3 pages.

* cited by examiner

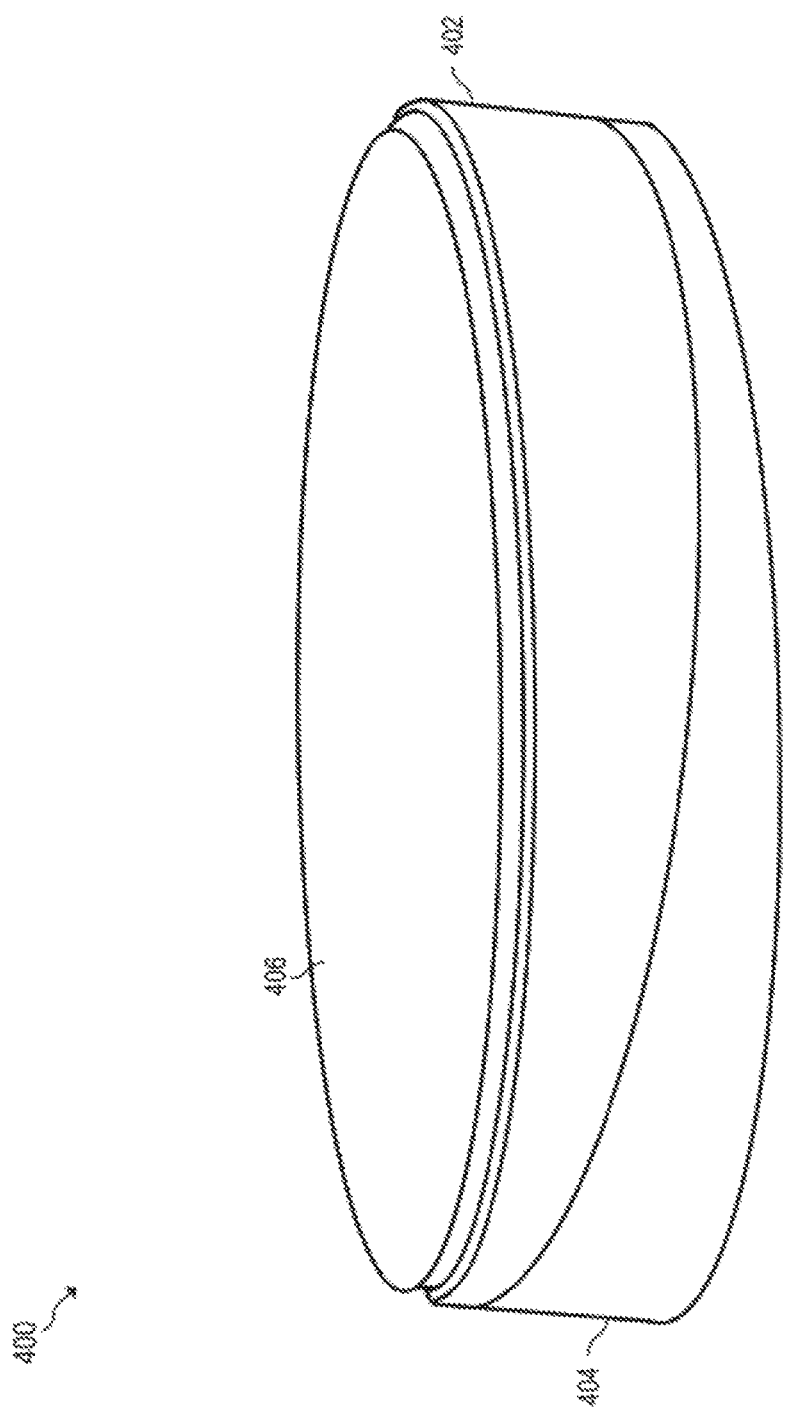

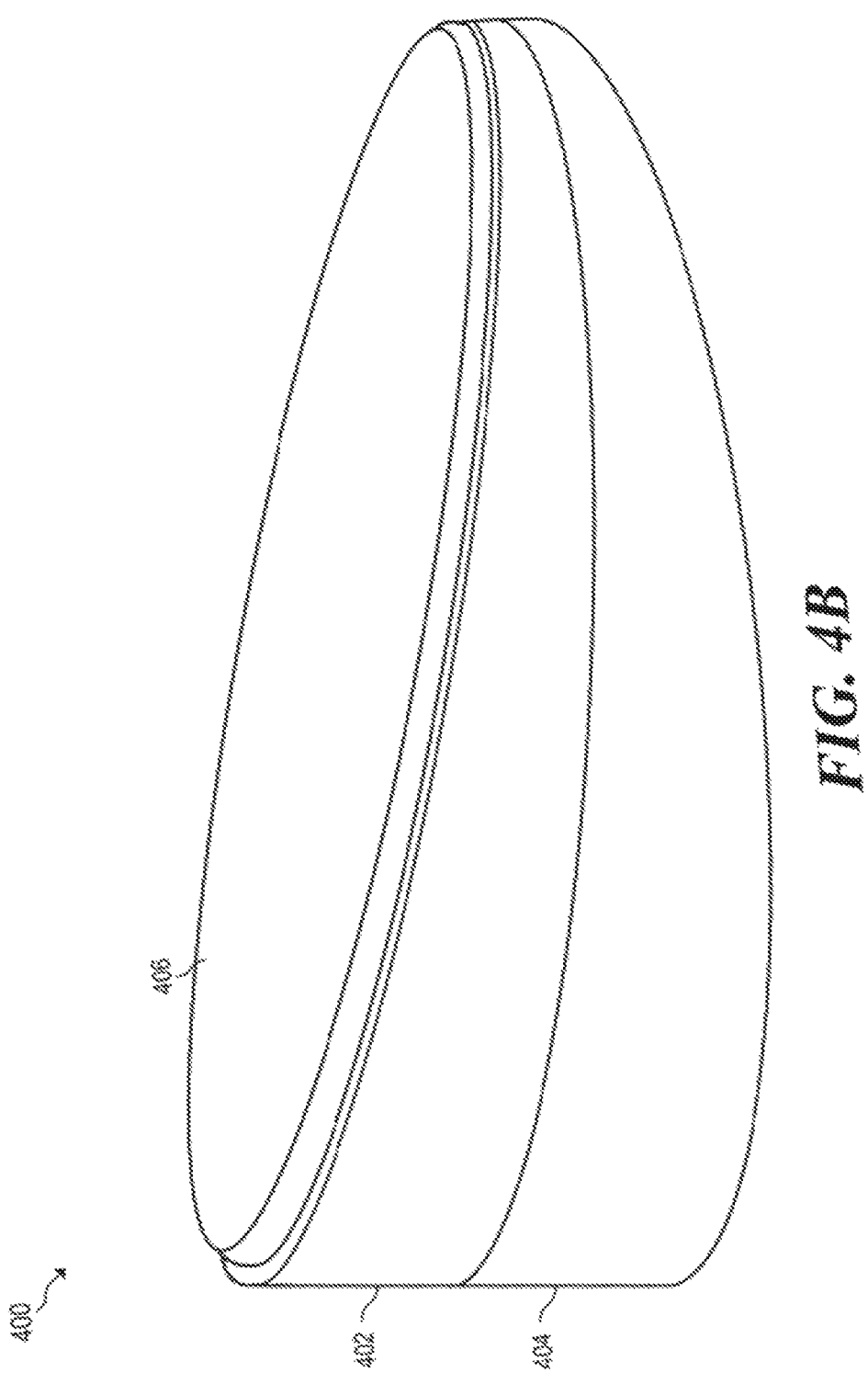

TURNTABLE PERIPHERAL FOR 3D SCANNING

BACKGROUND

A three-dimensional (3D) model of an object has many uses. A 3D model can be used in a variety of applications including, but not limited to, movie and video game assets, medical orthotics and prosthetics, industrial design, etc.

BRIEF DESCRIPTION OF THE DRAWINGS

The following detailed description references the drawings, wherein:

FIG. 4A is a graphical representation of an example turntable peripheral;

FIG. 4B is a graphical representation of an example turntable peripheral in a tilted position.

DETAILED DESCRIPTION

A capture system may be used to digitally capture data related to the shape and appearance of a real-world object. The captured data can then be used to construct a three-dimensional (3D) model of the object. Different techniques can be used to collect data related to the shape of a real-world object such as contact scanners, time-of-flight laser scanners, triangulation laser scanners, structured light scanners, etc. For example, a hand-held device can be used to collect shape data by making distance measurements while the hand-held device is repositioned. In this example, the hand-held device tracks its position using an internal coordinate system, which is used to reference the distance measurements.

Examples herein describe a turntable peripheral that facilitates 3D scanning. 3D capture techniques allow the user to place an object on a surface and scan it to create a complete 3D model from all sides. The model produced is a 3D mesh with texture, and the scan process involves progressively scanning the object from varying orientations and stitching these scans together to create a single, complete model. The turntable peripheral rotates the object during the 3D scan, where incremental scans are captured and aligned to fit to and extend the existing model.

Figure 1:
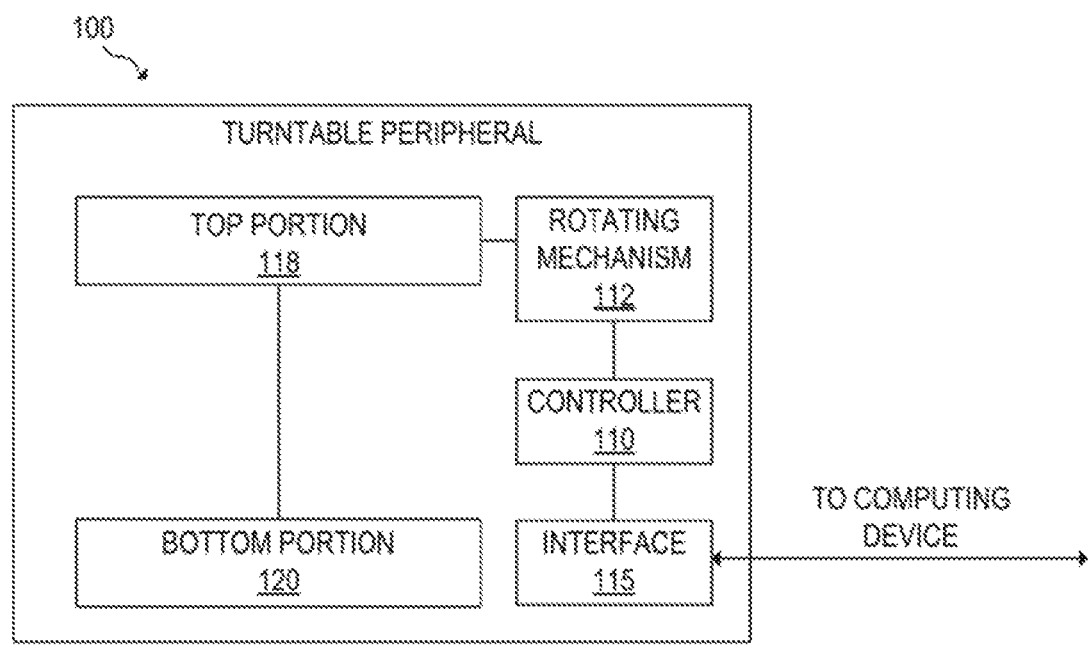
FIG. 1 is a block diagram of an example turntable peripheral for 3D scanning.

Referring now to the drawings, FIG. 1 is a block diagram of an example turntable peripheral 100 for 3D scanning. Turntable peripheral 100 may be any peripheral device (e.g., universal serial bus (USB) peripheral, wireless peripheral, etc.) that can communicate with a computing device with 3D scanning capabilities. In the embodiment of FIG. 1, computing device 200 includes a controller 110, rotating mechanism 112, an interface 115, a top portion 118, and a bottom portion 120.

Controller 110 may be one or more central processing units (CPUs), microprocessors, and/or other hardware devices suitable for retrieval and execution of instructions stored in firmware or some other non-transitory machine-readable storage medium. Controller 110 may use interface to process commands for controlling rotating mechanism 112. As an alternative or in addition to retrieving and executing instructions, controller 110 may include one or more electronic circuits comprising a number of electronic components for performing the functionality described below.

Interface 115 may include a number of electronic components for communicating with a computing device. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the scanning device. Alternatively, interface 115 may be a wireless interface, such as a wireless local area network (WLAN) interface or a near-field communication (NFC) interface. In operation, as detailed below, interface 115 may be used to send and receive data to and from a corresponding interface of the computing device.

Rotating mechanism 112 may be affixed to the top portion 118 and include components for rotating the top portion 118 during a 3D scan. For example, rotating mechanism 112 may include a rotating shaft that is attached to the top portion 118. In this example, the rotating shaft can be rotated with a motor that is powered by a power sour. The power source can be connected via the interface 115 (i.e., USB interface) or, in the case of a wireless turntable peripheral 100, be a battery (not shown). Rotating mechanism 112 may also be configured to modify the tilt of the object being scanned.

Top portion 118 may be positioned at the top of turntable peripheral 100 and have an upper surface (not shown) for holding an object. The upper surface can be non-slip so that the object remains stationary while the top portion 118 is repositioned. For example, turntable peripheral 100 may be a cylindrical pedestal with a top portion 118 that rotates on a bottom portion 120, which acts as a base. A lower surface of the bottom portion 120 rests on a scanning surface.

Figure 2:
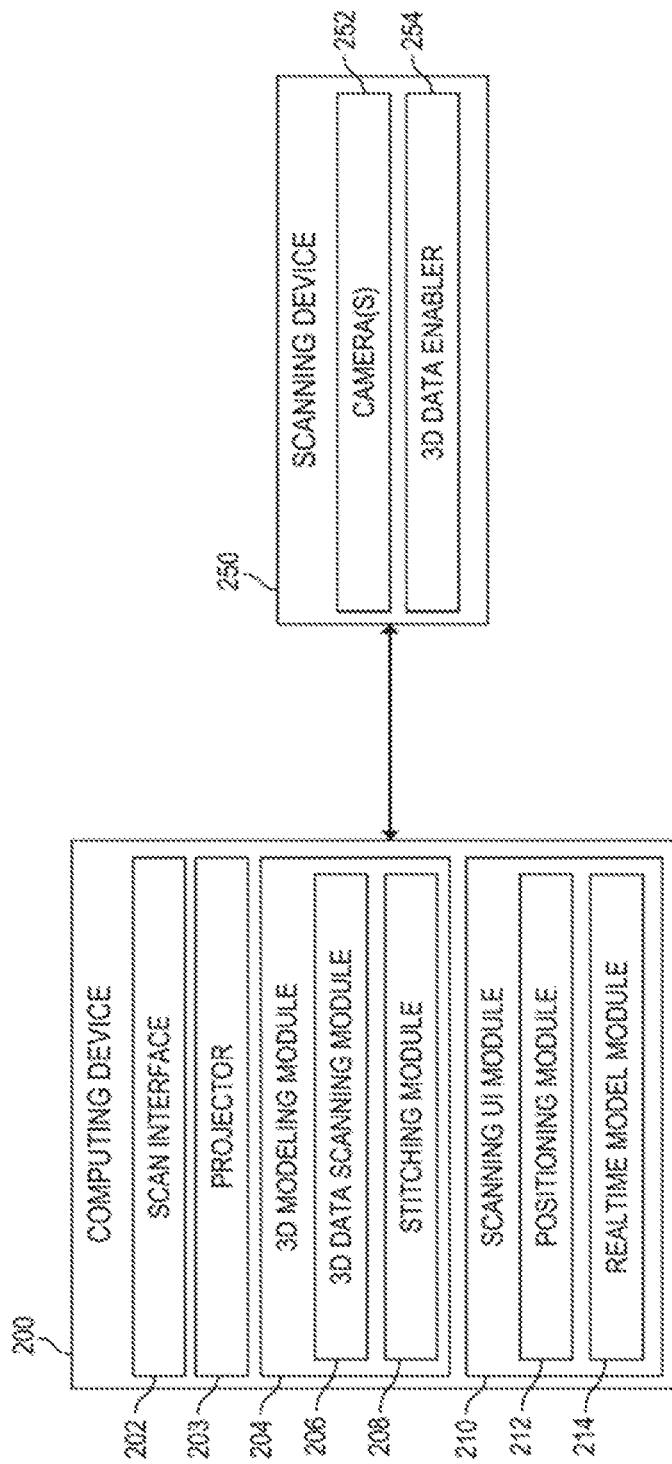
FIG. 2 is a block diagram of an example computing device in communication with a scanning device for capturing and processing 3D scan data.

FIG. 2 is a block diagram of an example computing device 200 in communication via a network 245 with a scanning device 250. As illustrated in FIG. 2 and described below, computing device 200 may communicate with scanning device 250 to capture and process 3D scan data. The computing device 200 also communicates with a turntable peripheral such as turntable peripheral 100 of FIG. 1.

As illustrated, computing device 200 may include a number of modules 202-214, while scanning device 250 may include a number of modules 252-254. Each of the modules may include a series of instructions encoded on a non-transitory machine-readable storage medium and executable by a processor of the respective device 200, 250. In addition or as an alternative, each module may include one or more hardware devices including electronic circuitry for implementing the functionality described below.

Computing device 200 may be a smartphone, notebook, desktop, tablet, workstation, mobile device, or any other device suitable for executing the functionality described below. As detailed below, computing device 200 may include a series of modules 202-214 for enabling capturing and processing 3D scan data.

Scan interface 202 may manage communications with the scanning device 250. Specifically, the scan interface 202 may initiate connections with the scanning device 250 and then send or receive scan data to/from the scanning device 250.

Projector 203 projects visual cues on and about a real-world object. For example, projector 203 can include light emitting diodes (LED's) for providing visual cues (i.e., scanned orientations, next orientation for scan cycle, etc.) during a scanning cycle. Scanning UI module 210 may use projector 203 during the scanning process to instruct a user on positioning the turntable peripheral 100 and/or real-world object for scanning.

3D modeling module 204 may process scan data of scanning device 250 to generate 3D models. 3D data scanning module 206 of 3D modeling module 204 obtains and processes scan data from scanning device 250. As the real-world object is repositioned by turntable peripheral 100, 3D data scanning module 206 can direct scanning device 250 to perform a scan cycle. A scan cycle includes a number of scan passes, each of which is taken while the object is in a different position and that can be combined to create a full 3D set of shape and appearance data for the object. For example, to scan the object in 3D, the scanning device 250 can project structured visible light and/or structured infrared light in a sequence of patterns on the object and capture and analyze the reflected light. The distortion of the structured light patterns on the object is then used to calculate the shape, depth and texture of the object. Scanning device 250 can also capture an image of the object to apply as surface texture for the model that is generated.

3D data scanning module 206 can also use scanning device 250 to perform a background scan. The background scan allows for the object to be distinguished the background (e.g., scanning surface, turntable peripheral 100, etc.). A background scan can be performed before the object is placed on the scanning surface. This background scan can also include multiple scans with the turntable peripheral 100 automatically rotated to tilted and untilted positions.

3D data scanning module 206 can also use scanning device 250 to perform a prescan. During a prescan, scanning device 250 quickly scans the object while turntable peripheral 100 rotates it 360 degrees. The quick scan is used to obtain preliminary scan data for creating a preliminary object model, which allows the user to review the overall shape of the object and to observe how the scan process progressively adds detail.

Stitching module 208 creates 3D models based on the scan data obtained by 3D data scanning module 206. Specifically, stitching module 208 can stitch together scan passes of 3D scan data to create a full 3D model of a real-world object. Each scan pass can be stitched by stitching module 208 to previous scan pass as it is obtained by 3D data scanning module 206. For example, the scan passes can be analyzed to identify distinctive features of the object for overlaying the scan passes at the appropriate points. After all the scan passes are stitched, a full 3D model of the real-world object is created.

Scanning UI module 210 presents a user interface for performing a 3D scan of a real-world object (i.e., a user interface of a 3D scanning application). Positioning module 212 of scanning UI module 210 can use projector 203 to provide visual cues as the object is repositioned for scanning by the turntable peripheral 100. After 3D data scanning module 206 performs the prescan, positioning module 212 can provide the visual cues directly on the object, turntable peripheral 100, and the scanning surface surrounding it. The visual cues can be, for example, as described below with respect to FIG. 5. The visual cues can be updated by positioning module 212 as the scan passes are performed. For example, completed scan passes can be identified on the scanning surface, and the current position of the object on the turntable peripheral 100 can also be shown.

Real-time model module 214 can generate a real-time representation of the object (e.g., image stream from a camera) while a scan is being performed. As each scan pass is completed and the model is updated, the real-time representation can be updated to reflect new details from the scan pass in the user interface. Real-time model can also allow the user to reposition the model in the user interface so that all sides of the model can be examined.

Scanning device 250 can be a peripheral or integrated component of computing device 200. Scanning device 250 is any device suitable of capturing 3D data such as a structured light camera device, a laser scanner, etc. As detailed below, scanning device 250 may include a series of modules 252-254 for capturing 3D data.

In FIG. 2, scanning device 250 includes camera(s) 252 for capturing structured light. For example, camera(s) 252 can include a combination of standard and infrared cameras, where a standard camera is used to capture texturing on the surface of the object and an infrared camera is used to capture shape data. The infrared camera can analyze a pattern of structured infrared light (e.g., star field, etc.) projected on the surface of the object to obtain the shape data. In this case, the structured infrared light can be projected by a 3D data enabler 254.

Figure 3:
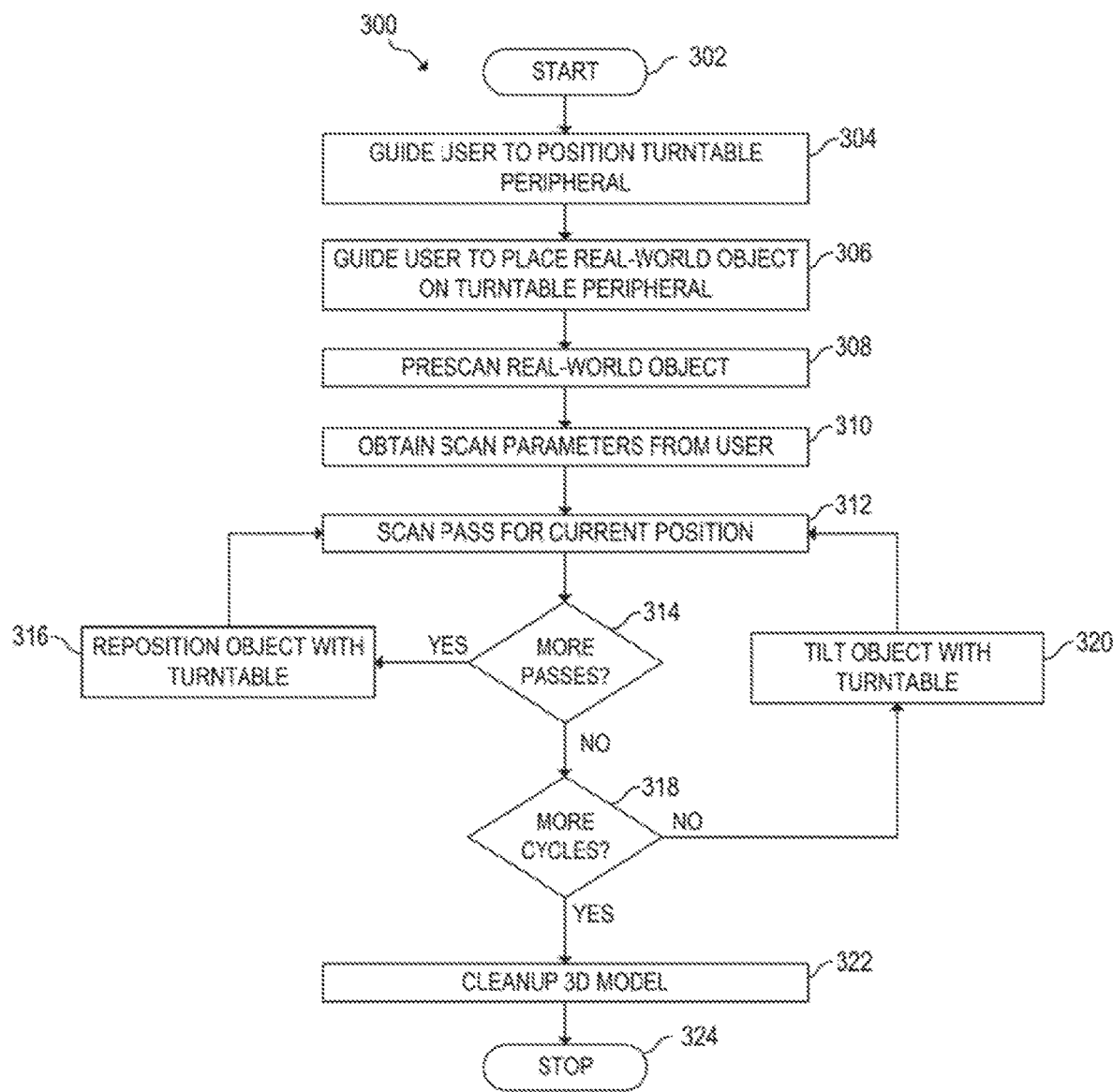
FIG. 3 is a flowchart of an example method for execution by a computing device equipped with a turntable peripheral for 3D scanning.

FIG. 3 is a flowchart of an example method 300 for execution by a computing device 200 for capturing and processing 3D scan data. Although execution of method 300 is described below with reference to turntable peripheral 100 of FIG. 1 and computing device 200 of FIG. 2, other suitable devices for execution of method 300 may be used. Method 300 may be implemented in the form of executable instructions stored on a non-transitory machine-readable storage medium, such as machine-readable storage medium 120, and/or in the form of electronic circuitry.

FIG. 3 is a flowchart of an example method 300 for execution by a computing device 200 equipped with a turntable peripheral 100 for 3D scanning. Although execution of method 300 is described below with reference to computing device 200 of FIG. 2 and peripheral device 100 of FIG. 1, other suitable devices for execution of method 300 may be used. Method 300 may be implemented in the form of executable instructions stored on a non-transitory machine-readable storage medium, such as machine-readable storage medium 120, and/or in the form of electronic circuitry.

Method 300 may start in block 302 and continue to block 304, where computing device 200 guides the user to position the turntable peripheral 100 on a scanning surface. For example, computing device 200 can project a visual cue for the position of the turntable peripheral 100 on the scanning surface. In block 306, computing device 200 guides a user to place a real-world object on the turntable peripheral 100. For example, computing device 200 can project another visual cue identifying a position and orientation for the object on an upper surface of the turntable peripheral 100.

In block 308, computing device 200 performs a prescan of the object to generate a preliminary model. In block 310, computing device 200 obtains scan parameters from the user. For example, the user can specify a reference object that has a similar shape to the object being scanned.

In block 312, computing device 200 performs a scan pass for the current position of the object. As the scan pass is performed, the scan pass is stitched into the preliminary model to improve its detail. In block 314, computing device 200 determines if there are more scan passes to perform (i.e., whether the scan cycle is complete). If there are more scan passes to perform, computing device 200 guides uses the turntable peripheral 100 to rotate the object in block 316. After the object is rotated, method 300 returns to block 312, where computing device 200 performs the next scan pass.

If there are no more scan passes to perform, computing device 200 determines if additional scan cycles should be performed in block 318. For example, multiple scan cycles can be performed for different orientations (i.e., tilt) of the object. If there are additional scan cycles to perform, computing device 200 uses the turntable peripheral 100 to change the tilt of the object in block 320. After the tilt of the object is changed on the turntable peripheral 100, method 300 returns to block 312 to initiate a second scan cycle.

If the user is satisfied with the 3D model, computing device 200 cleans up the 3D model in block 322. For example, computing device 200 can remove artifacts and finalize the stitching of the 3D model. Method 300 may subsequently proceed to block 324, where method 300 may stop.

FIG. 4A is a graphical representation of an example turntable peripheral 400. As shown, the turntable peripheral 400 has a top portion 402 and a bottom portion 404. The top portion 402 has an upper surface 406. Objects can be placed on the upper surface 406 for 3D scanning. As the 3D scan is performed, the top portion 402 can rotate the object during a scan cycle. In this manner, different perspectives of the object can be used to collect 3D scan data for each scan pass of the scan cycle.

FIG. 4B is a graphical representation of an example turntable peripheral 400 in a tilted position. Similar to FIG. 4A, the turntable peripheral 400 has a top portion 402 and a bottom portion 404. In FIG. 4B, the top portion 402 is tilted so that the object is tilted on the upper surface 406 during a scan cycle. Because the object is tilted, additional perspectives of the object can be used to collect 3D scan data to further enhance the 3D model.

In some cases, stabilizing element can be used with the turntable peripheral 400 to keep the object stationary on the upper surface 406 during scan cycles. Examples of stabilizing elements include, but are not limited to, magnets, adhesive putty, etc. In other cases, a positioning element can be used with the turntable peripheral 400 to change the position of the object on the upper surface 406. For example, a wedge can be used to assist in propping the object in a desired orientation during a scan cycle.

Figure 5:
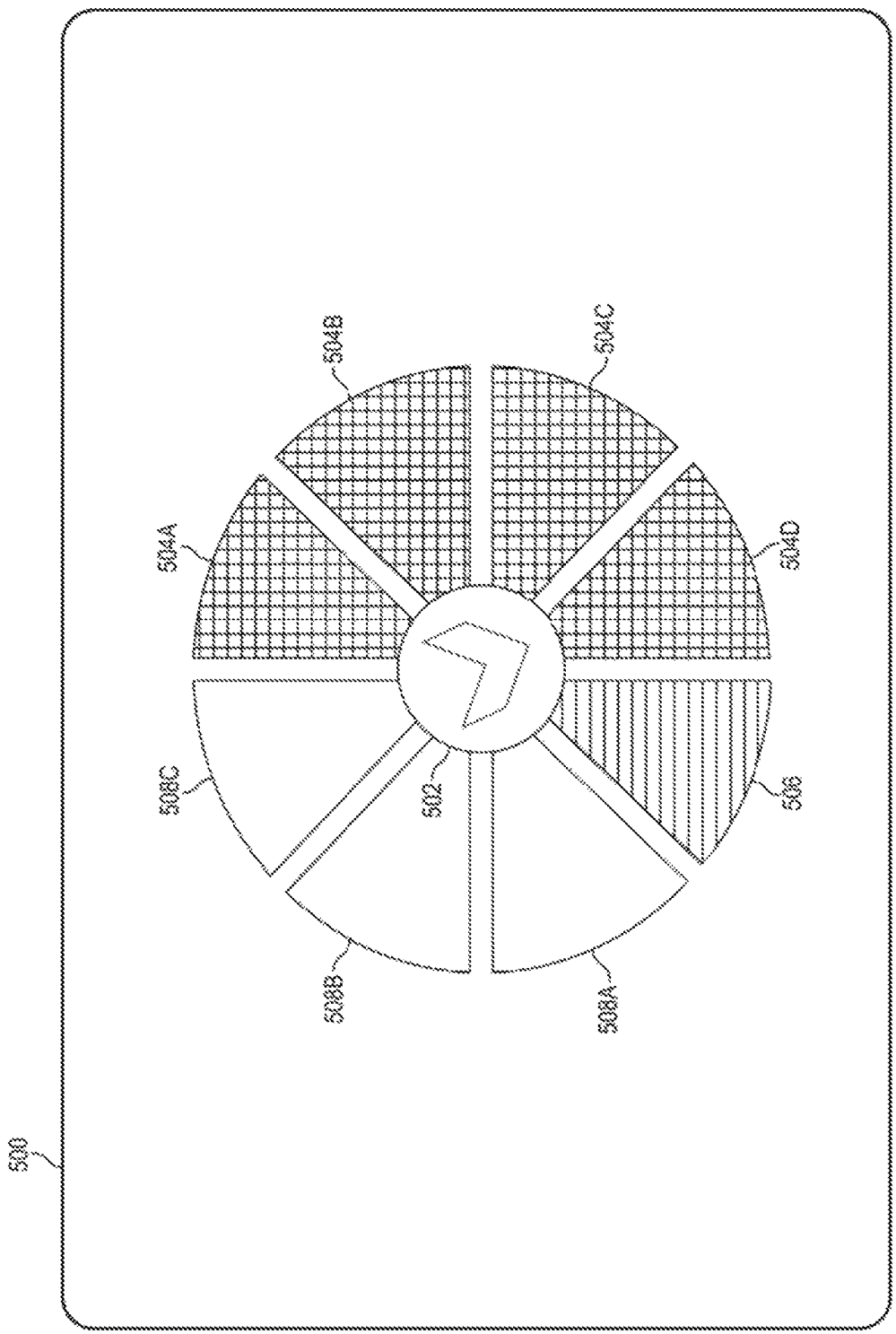
FIG. 5 is a diagram of an example user interface for providing visual cues during a 3D scan.

FIG. 5 is a diagram of an example user interface 500 for providing visual cues during a 3D data capture. The user interface 500 can be projected onto a scanning surface to show the progress of a scan cycle during the 3D data capture. As depicted, user interface 500 shows orientations of the object during scan passes of the scan cycle, which includes an object position 502, completed scan passes 504A, 504B, 504C, 504D, a next scan pass 506, and future scan passes 508A, 508B, 508C.

Object position 502 shows the position and direction of the object being scanned. As the object is moved by the turntable peripheral 100, object position 502 can be updated in real-time. When a scan pass is completed, user interface 500 is updated to show the completed pass 504A-504D. As shown, scan pass 504D has just been completed, and the turntable peripheral 100 is about to reposition the object for the next scan pass 506. When the next scan pass 506 and future scan passes 508A-508C are completed, the scan cycle is completed. At this stage, it can be determined whether the user is satisfied with the 3D model.

The foregoing disclosure describes a number of examples of a turntable peripheral for 3D scanning. In this manner, the examples disclosed herein enable 3D data capture by automatically repositioning an object during a 3D scan.

We claim:

1. A turntable peripheral comprising:
a bottom portion having a lower surface to rest on a scanning surface beneath a three dimensional (3D) scanning device;
a top portion having an upper surface on which an object rests during a 3D scan that is performed by the 3D scanning device;
a rotating mechanism for rotating the top portion with the object during the 3D scan according to positioning commands, wherein the rotating mechanism is configured to be in a tilted position while the top portion is rotated, and wherein the rotating mechanism is further configured to rotate the for a first scan cycle in an untilted position and a second scan cycle in the tilted position; and
an interface to receive the positioning commands from a computing device during the 3D scan,
wherein the turntable peripheral is configured to be positioned on the scanning surface based on a visual cue that is projected by a projector.

2. The turntable peripheral of claim 1, wherein the object is rotated during a prescan of the object.

3. The turntable peripheral of claim 1, wherein the turntable peripheral further comprises a plurality of stabilizing elements placed on the upper surface to stabilize the object while the top portion is rotated.

4. A method for using a turntable peripheral for three dimensional (3D) scanning, the method comprising:
performing a plurality of scan passes of the an object to obtain 3D scan data;
sending a plurality of positioning commands to the turntable peripheral, wherein the object is rotated by the turntable peripheral in a tilted and untilted position during the plurality of scan passes;
using a projector to project a visual cue related to a position of the object as the object is rotated to show orientations of the object during the plurality of scan passes to instruct a user on positioning one or more of the turntable peripheral and the object for scanning; and
using the 3D scan data to generate a 3D model of the object, wherein a real-time representation of the 3D model is shown on a user interface as each of the plurality of 3D scan passes is incorporated into the 3D model.

5. The method of claim 4, further comprising:
providing a turntable visual cue on a scanning surface, wherein the turntable peripheral is positioned on the scanning surface based on the turntable visual cue.

6. The method of claim 5, further comprising:
providing an object visual cue on the turntable peripheral, wherein the object is positioned on the turntable peripheral based on the object visual cue.

7. The method of claim 4, further comprising:
generating a preliminary model based on a prescan of an object, wherein the object is rotated by the turntable peripheral during the prescan, and wherein the plurality of scan passes are incorporated into the preliminary model to generate the 3D model.

8. The method of claim 6, further comprising:
directing the user to place a plurality of stabilizing elements on the turntable peripheral to stabilize the object.

9. A non-transitory machine-readable storage medium encoded with instructions executable by a processor for using a turntable peripheral for three dimensional (3D) scanning, the machine-readable storage medium comprising instructions to:
  generate a preliminary model based on a prescan of an object, wherein the object is rotated by the turntable peripheral during the prescan;
  perform a plurality of scan passes of the object to obtain 3D scan data;
  send a plurality of positioning commands to the turntable peripheral, wherein the object is rotated by the turntable peripheral in a tilted and untilted position during the plurality of scan passes;
  use a projector to project a visual cue related to a position of the object as the object is rotated to show orientations of the object during the plurality of scan passes to instruct a user on positioning one or more of the turntable peripheral and the object for scanning; and
  use the 3D scan data to generate a 3D model of the object based on the preliminary model, wherein a real-time representation of the 3D model is shown on a user interface as each of the plurality of 3D scan passes is incorporated into the preliminary 3D model.

10. The non-transitory machine-readable storage medium of claim 9, the instructions further to:
  provide a turntable visual cue on a scanning surface, wherein the turntable peripheral is positioned on the scanning surface based on the turntable visual cue.

11. The non-transitory machine-readable storage medium of claim 10, the instructions further to:
  provide an object visual cue on the turntable peripheral, wherein the object is positioned on the turntable peripheral based on the object visual cue.

12. The non-transitory machine-readable storage medium of claim 9, the instructions further to:
  direct the user to place a plurality of stabilizing elements on the turntable peripheral to stabilize the object.

\* \* \* \* \*